(12) United States Patent
Mutou et al.

(10) Patent No.: US 10,152,890 B2
(45) Date of Patent: Dec. 11, 2018

(54) ON-VEHICLE CAMERA DEVICE

(71) Applicant: HITACHI AUTOMOTIVE SYSTEMS, LTD., Ibaraki (JP)

(72) Inventors: Yoshiyuki Mutou, Hitachinaka (JP); Rikiya Kashimura, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 0 days.

(21) Appl. No.: 15/538,865

(22) PCT Filed: Jan. 12, 2016

(86) PCT No.: PCT/JP2016/050603
§ 371 (c)(1),
(2) Date: Jun. 22, 2017

(87) PCT Pub. No.: WO2016/117401
PCT Pub. Date: Jul. 28, 2016

(65) Prior Publication Data
US 2017/0345306 A1    Nov. 30, 2017

(30) Foreign Application Priority Data

Jan. 20, 2015    (JP) .................................. 2015-008837

(51) Int. Cl.
*G08G 1/16* (2006.01)
*H04N 5/232* (2006.01)
(Continued)

(52) U.S. Cl.
CPC ............... *G08G 1/16* (2013.01); *H04N 5/232* (2013.01); *H04N 5/345* (2013.01); *H04N 5/367* (2013.01); *H04N 7/18* (2013.01); *H04N 17/002* (2013.01)

(58) Field of Classification Search
CPC .......... G08G 1/16; H04N 5/232; H04N 5/345; H04N 7/18; H04N 17/002
(Continued)

(56) References Cited

U.S. PATENT DOCUMENTS 6,118,482 A    9/2000  Clark et al.
6,477,318 B2 *  11/2002  Ishii ..................... H04N 9/8205
                                                              358/906

(Continued)

FOREIGN PATENT DOCUMENTS

JP    2009-33550 A    2/2009
JP    2009-118427 A   5/2009

OTHER PUBLICATIONS

International Search Report for WO 2016/117401 A1, dated Mar. 29, 2016.

(Continued)

*Primary Examiner* — Angelina Shudy
(74) *Attorney, Agent, or Firm* — Volpe and Koenig, P.C.

(57) ABSTRACT

Provided is an on-vehicle camera device that swiftly and accurately detects, in every frame, data line signals of respective bits from imaging elements. This on-vehicle camera device includes a failure-diagnosis processing unit that diagnoses whether the data line signals of imaging element units, are in a fixed state. Furthermore, the imaging element units each include an entire imaging region that is divided into an effective image region and an ineffective image region. Also provided is a diagnosis data region that includes fixation diagnosis data for diagnosing whether the data line signals of the imaging element units in the ineffective image regions are in a fixed state. In an image acquisition period in which image data of the entire imaging region is acquired, and/or an image-calculation processing period, the failure-diagnosis processing unit uses the fixation
(Continued)

diagnosis data of the diagnosis data region to perform failure-diagnosis processing.

6 Claims, 7 Drawing Sheets

(51) Int. Cl.
  *H04N 5/345* (2011.01)
  *H04N 7/18* (2006.01)
  *H04N 5/367* (2011.01)
  *H04N 17/00* (2006.01)

(58) Field of Classification Search
  USPC .......................................................... 701/301
  See application file for complete search history.

(56) References Cited

U.S. PATENT DOCUMENTS

| | | | | |
|---|---|---|---|---|
| 7,952,632 | B2* | 5/2011 | Schnaithmann | H04N 17/002 |
| | | | | 348/143 |
| 9,742,974 | B2* | 8/2017 | Tang | H04N 5/23206 |
| 9,848,172 | B2* | 12/2017 | DeAngelis | A63B 24/0021 |
| 9,900,535 | B2* | 2/2018 | Takado | H04N 5/378 |
| 2004/0239770 | A1* | 12/2004 | Misawa | H04N 5/3696 |
| | | | | 348/207.99 |
| 2004/0252874 | A1* | 12/2004 | Yamazaki | H04N 5/32 |
| | | | | 382/132 |
| 2009/0122174 | A1 | 5/2009 | Kano | |
| 2010/0091137 | A1 | 4/2010 | Schnaithmann | |
| 2013/0113934 | A1* | 5/2013 | Hotta | G06K 9/00778 |
| | | | | 348/143 |
| 2014/0307072 | A1* | 10/2014 | Takahashi | H04N 5/23296 |
| | | | | 348/65 |
| 2015/0373274 | A1* | 12/2015 | Kuwabara | G06T 19/006 |
| | | | | 345/633 |
| 2016/0031371 | A1* | 2/2016 | Kimata | B60R 1/00 |
| | | | | 348/148 |
| 2016/0173796 | A1* | 6/2016 | Takado | H04N 5/378 |
| | | | | 348/302 |
| 2016/0234427 | A1* | 8/2016 | Yoshino | A61B 1/00036 |
| 2016/0373673 | A1* | 12/2016 | Okura | H04N 5/3598 |
| 2017/0302867 | A1* | 10/2017 | Ichikawa | H04N 1/409 |
| 2018/0063418 | A1* | 3/2018 | Oyama | G06F 3/0412 |
| 2018/0070057 | A1* | 3/2018 | DeAngelis | A63B 24/0021 |
| 2018/0115692 | A1* | 4/2018 | Du | H04N 5/2259 |
| 2018/0124321 | A1* | 5/2018 | Hayasaka | H04N 5/23267 |

OTHER PUBLICATIONS

Japanese-language Written Opinion (PCT/ISA/237) issued in PCT Application No. PCT/JP2016/050603 dated Mar. 29, 2016, 3 pages.
Extended European Search Report dated Jul. 20, 2018 for the European Patent Application No. 16740008.4.

* cited by examiner

ON-VEHICLE CAMERA DEVICE

TECHNICAL FIELD

The present invention relates to an on-vehicle camera device.

BACKGROUND ART

In PTL 1, a technology is disclosed in which a failure detection pattern region is formed in an ineffective pixel region, an image signal is read out from the entire region of an effective pixel region, and then, a failure detection pattern is read out by switching a driving method to a driving method different from that of the effective pixel region, and a case where a signal according to the pattern is not output is determined as failure.

CITATION LIST

Patent Literature

PTL 1: Japanese Patent Application Laid-Open No. 2009-118427

SUMMARY OF INVENTION

Technical Problem

In the technology of PTL 1, the image signal of the effective pixel region is read out, and then, the failure detection pattern is read out by switching the driving method, and thus, the entire reading out period is longer by that much, the start of image recognition processing is delayed, and an operation using an image recognition result is delayed. In addition, there is a concern that image processing is paused while the failure detection pattern is read out.

An object of the present invention is to swiftly and accurately detect, in every frame, data line signals of respective bits from imaging elements.

Solution to Problem

In order to solve the above issue, an on-vehicle camera device according to the present invention includes: a failure-diagnosis processing unit that diagnoses whether a data line signal of an imaging element unit is in a fixed state, wherein the imaging element unit includes an entire imaging region that is divided into an effective image region in which image data to be output is used for image-calculation and an ineffective image region in which the image data to be output is not used for the image-calculation, and includes a diagnosis data region that includes fixation diagnosis data for diagnosing whether the data line signal of the imaging element unit is in the fixed state in the ineffective image region, and the failure-diagnosis processing unit uses the fixation diagnosis data of the diagnosis data region to perform failure-diagnosis processing in an image acquisition period in which image data of the entire imaging region is acquired and/or an image-calculation processing period in which image-calculation processing is performed on the basis of image data of the effective image region after the image acquisition period.

Advantageous Effects of Invention

According to the present invention, it is possible to construct the on-vehicle camera device which is capable of accurately detecting that any one of the data line signals from the imaging element is in the fixed state, abnormality occurs in a luminance value of the acquired image data, and suitable parallax calculation processing and image recognition processing are not capable of being performed, and thus, a state is obtained in which a target distance is not capable of being calculated, and of providing a safety driving system having higher reliability.

DESCRIPTION OF EMBODIMENTS

Hereinafter, examples according to the present invention will be described in detail with reference to the attached drawings. Furthermore, in the following description, a case of a stereo camera will be described as an example, but the present invention is not limited to the stereo camera, and can also be applied to an on-vehicle camera device including a monocular camera or a plurality of cameras.

Examples of a safety driving support system of an automobile include an inter-vehicle distance alarm system, an adaptive cruise control system, a pre-crash brake system, and the like, and a sensing technology of accurately recognizing the environment in the front of the vehicle, such as a preceding vehicle, a driving lane, and an obstacle in the periphery of the own vehicle, is essential at the time of constructing the systems described above. Examples of a sensor recognizing the environment in the front of the vehicle include an on-vehicle camera device.

Among the on-vehicle camera devices, a stereo camera is capable of recognizing a solid object form parallax information of right and left cameras, and thus, is excellent in the detection of a solid object having an arbitrary shape, such as a pedestrian or curbstone. In the stereo camera, parallax is calculated according to a difference in luminance information of images acquired at the same timing from imaging element units of the camera, which are attached to the camera on a right side and a left side in a vehicle traveling direction, and thus, the solid object can be recognized.

However, in a case where a data line signal, which is an output signal, is in a fixed state due to disconnection or short-circuit in a data line with respect to the right and left imaging element units, an image obtained in an image recognition processing unit is luminance information different from that of the actual environment, and thus, an abnormal parallax calculation result is obtained, and the solid object is not capable of being suitably detected. Therefore, in order to ensure the reliability of the stereo camera, a diagnosis function for detecting that the data line signal from the imaging element unit is in the fixed state is required.

In an on-vehicle camera device of the present invention, fixed value data for data line signal fixation diagnosis is embedded in an ineffective image region other than an effective image region used in an image recognition processing unit, in an image region output from an imaging element, and data line signal fixation diagnosis is suitably executed, in every frame, at a suitable timing.

Figure 1:
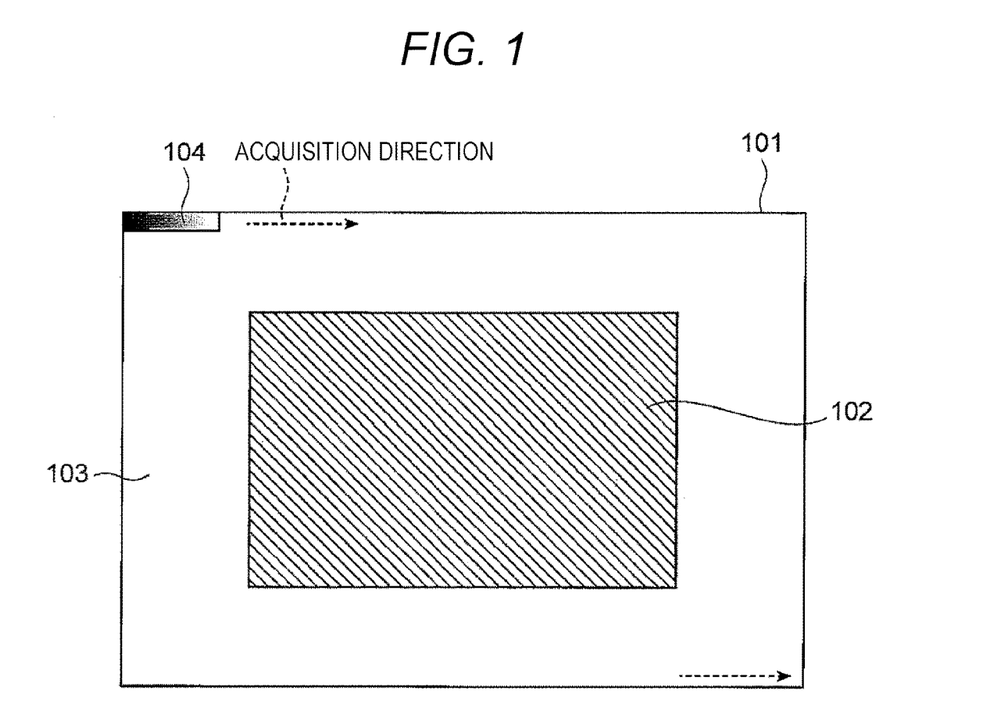
FIG. 1 is a diagram illustrating a configuration of an output image region of an imaging element of an example.

One representative example of the on-vehicle camera devices of the present invention is a stereo camera 201 including two imaging elements, and image data illustrated in FIG. 1 is acquired from the imaging element.

FIG. 1 is a diagram illustrating a configuration of an output image region of an imaging element of this example.

An entire imaging region 101 is image data of an entire screen output by an imaging element, and has a configuration including an effective image region 102, an ineffective image region 103, and a diagnosis data region 104. The effective image region 102, for example, is a region including image data which is used in an image recognition processing unit 207 for recognizing a solid object, and the ineffective image region 103 is a region in which image data is not used in the image recognition processing unit 207. Then, the diagnosis data region 104 is a region stored in a part of the ineffective image region 103. That is, the entire imaging region 101 is divided into the effective image region 102 in which the image data to be output is used for image-calculation and the ineffective image region 103 in which the image data to be output is not used for the image-calculation, and includes the diagnosis data region 104 including fixation diagnosis data for diagnosing whether a data line signal of an imaging element unit in the ineffective image region 103 is in the fixed state.

The position or the size of the effective image region 102 is capable of being fixed or of varying according to the application. The diagnosis data region 104 includes the fixation diagnosis data which is capable of detecting the fixed state of the data line signal, and specifically, includes HI level fixation diagnosis data 302 which is fixed value data capable of detecting an HI level fixed state of the data line signal and LO level fixation diagnosis data 301 which is fixed value data capable of detecting an LO level fixed state of the data line signal. The diagnosis data region 104 is provided in a position on a front side of the effective image region 102 in a data acquisition direction in which the image data is acquired, and in this example, is provided on an upper left corner of the entire imaging region 101.

Figure 3:
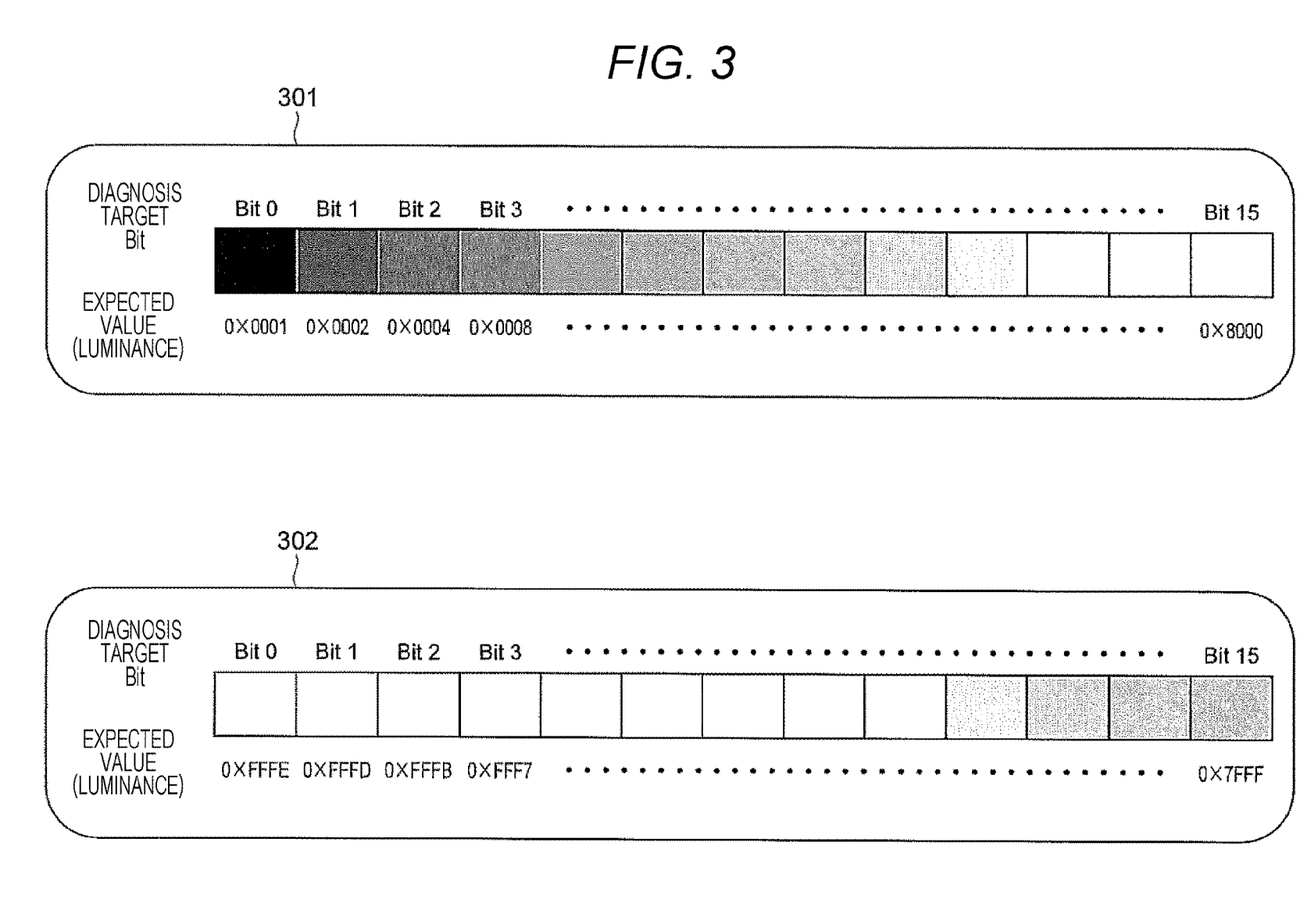
FIG. 3 is a configuration diagram of a diagnosis data region.

FIG. 3 is a configuration diagram of the diagnosis data region, and is a diagram illustrating a configuration example of the fixation diagnosis data in a case of using an imaging element having 16-bit gradation.

The LO level fixation diagnosis data 301 includes diagnosis data of minimum 16 pixels in order to execute fixation diagnosis of a data line signal of the 16-bit gradation. In order to detect the LO level fixed state of the data line signal, expected value data which is embedded in the ineffective image region 103 as diagnosis data sets a value in which only a bit corresponding to a diagnosis target data line bit is HI and the other bits are LO.

For example, expected value data for detecting an LO level fixed state of Bit 0 sets 0x0001 (only the value of the Bit 0 is HI) as diagnosis 16-bit data. In a case where a data line signal of the Bit 0 is in the LO level fixed state, the value of a pixel in which LO level fixation diagnosis data of Bit 0 is stored is 0x0000 at the time of acquiring the image data output from the imaging element, and thus, the data line signal can be diagnosed as being in the LO level fixed state. LO level fixation diagnosis data items of Bit 1 to Bit 15 are similarly set.

Similarly, the HI level fixation diagnosis data 302 also includes diagnosis data of 16 pixels as with the gradation of the imaging element. In order to detect the HI level fixed state of the data line signal, expected value data which is embedded in the ineffective image region 103 as diagnosis data sets a value in which only a bit corresponding to a diagnosis target data line bit is LO, and the other bits are HI.

For example, expected value data for detecting an HI level fixed state of the Bit 0 sets 0xFFFE (the value of the Bit 0 is LO) as the diagnosis 16-bit data. In a case where a data line of the Bit 0 is in the HI level fixed state, the value of a pixel in which HI level fixation diagnosis data of the Bit 0 is stored is 0xFFFF at the time of acquiring the image data output from the imaging element, and thus, the data line signal can be diagnosed as being in the HI level fixed state. HI level fixation diagnosis data items of the Bit 1 to the Bit 15 are similarly set.

The fixation diagnosis data described above is output from the imaging element, and a storage portion of the fixation diagnosis data at an image data acquisition time point is confirmed, and thus, the LO level fixed state or the HI level fixed state of the data line signal can be detected.

Figure 2:
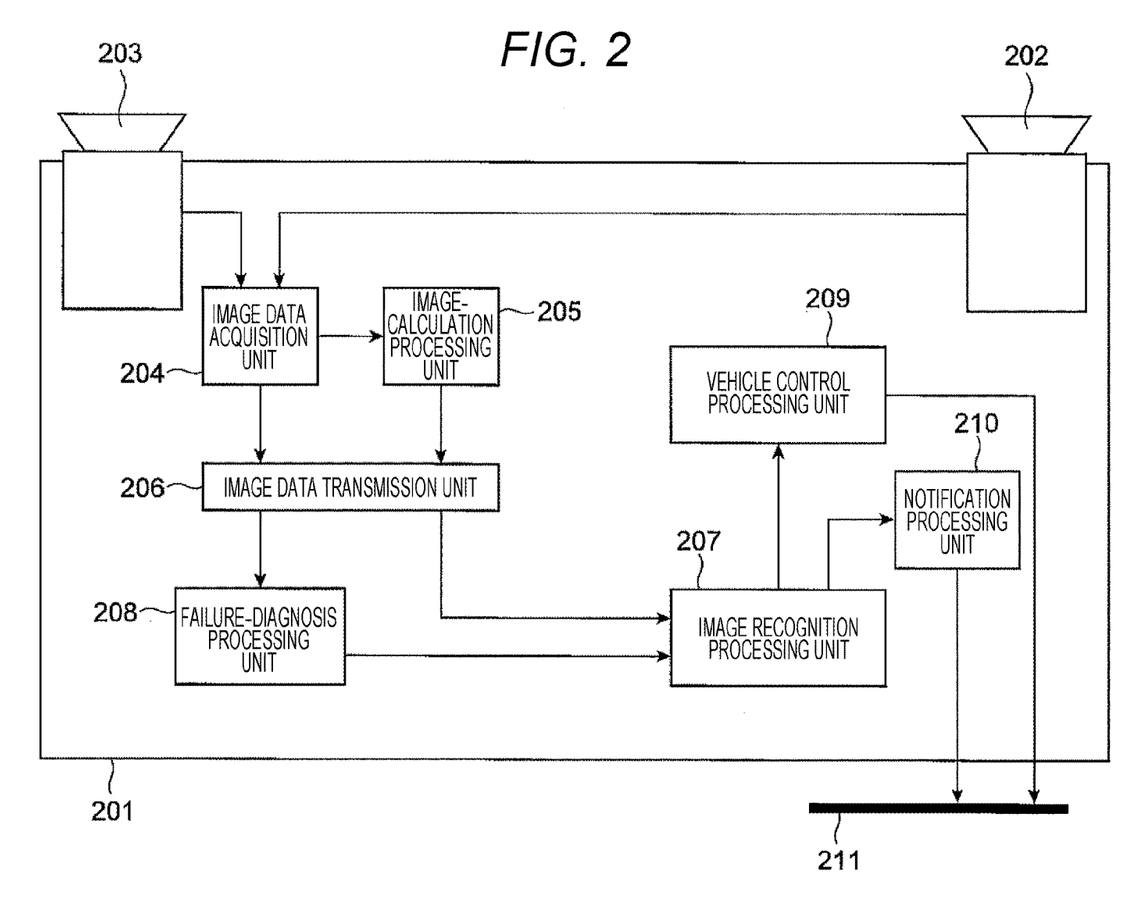
FIG. 2 is a block configuration diagram of a stereo camera.

FIG. 2 is a block configuration diagram of the stereo camera 201 according to an example of the present invention.

The stereo camera 201 includes a right imaging element unit 202 attached to the stereo camera 201 on a right side in the vehicle traveling direction, a left imaging element unit 203 attached to the stereo camera 201 on a left side in the vehicle traveling direction, an image data acquisition unit 204 acquiring image data which is output from the right imaging element unit 202 and the left imaging element unit 203, an image-calculation processing unit 205 calculating parallax information or the like required for recognition processing of the solid object from the right and left image data items which are acquired in the image data acquisition unit 204, an image data transmission unit 206 transmitting the right and left image data items acquired in the image data acquisition unit 204 or the image data generated in the image-calculation processing unit 205 to a processing region to be used, an image recognition processing unit 207 executing solid object recognition or the like on the basis of various image data items such as the parallax information, a failure-diagnosis processing unit 208 executing failure-diagnosis of whether the data line signal is in the fixed state by using the image data line fixation diagnosis data, a vehicle control processing unit 209 calculating vehicle control processing on the basis of a recognition result detected by the image recognition processing unit 207, and a notification processing unit 210 for transmitting an abnormal state to the outside when the abnormality is determined by the failure-diagnosis processing unit 208.

In addition, the stereo camera 201 connects vehicle control information calculated by the vehicle control processing unit 209 or failure information output from the notification processing unit 210 to an on-vehicle communication bus 211 such as a controller area network (CAN), and transmits output information of the stereo camera 201 to an external ECU.

Each of the right imaging element unit 202 and the left imaging element unit 203 has a configuration in which a plurality of pixels are arranged in a matrix. Image data items of images which are imaged by the right imaging element unit 202 and the left imaging element unit 203 are acquired by the image data acquisition unit 204. In this example, in each of the right imaging element unit 202 and the left imaging element unit 203, the image data is acquired from a pixel on a left edge of a first column of the entire imaging region 101 towards a right edge in a row direction, and all image data items of the entire imaging region 101 (the image data items of the entire screen) are acquired while sequentially proceeding to a lower side after a second column in a column direction. Then, the image data of the effective image region 102 from all of the acquired image data items is used for the image-calculation processing of the image-calculation processing unit 205. The diagnosis data region 104 is provided on an upper left corner of the entire imaging region 101, and thus, is initially acquired when the image data is acquired from the entire imaging region 101.

Figure 4:
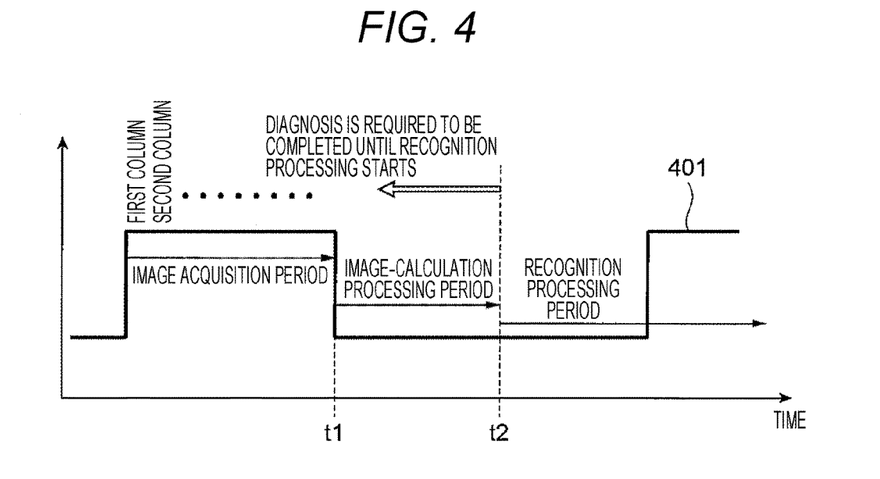
FIG. 4 is a diagram illustrating an example of a timing from acquisition of image data from right and left imaging element units to execution of image recognition processing.

FIG. 4 is a diagram illustrating an example of a timing from the acquisition of the image data from the right imaging element unit 202 and the left imaging element unit 203 to the start of the processing in the image recognition processing unit 207.

As an example in which a vertical synchronization signal 401 representing an image data acquisition timing from the imaging element is an HI level signal during an image data output period, the vertical synchronization signal 401 is in an HI level during data of the number of all effective lines output from the imaging element is acquired in the image data acquisition unit 204, that is, during the image data of the entire imaging region 101 is acquired.

The vertical synchronization signal 401 is in an LO level at a time point t1 at which the acquisition of the image data of the entire imaging region 101 is completed in the image data acquisition unit 204, and the image-calculation processing starts at the same timing in the image-calculation processing unit 205. Then, the image data items required for the solid object recognition are arranged at a time point t2 at which the calculation processing of the image-calculation processing unit 205 is completed, and thus, the calculation processing of the image recognition processing unit 207 starts. Accordingly, the fixed state of the data line signal from the imaging element is required to be detected until the calculation processing of the image recognition processing unit 207 starts.

According to the present invention, the diagnosis data region 104 is provided in the ineffective image region 103, and the fixation diagnosis data of the diagnosis data region 104 is also acquired when the image data of the entire imaging region 101 is acquired by the image data acquisition unit 204, and thus, it is possible to diagnose the fixed state of the data line signal until the recognition processing starts, that is, in an image acquisition period and/or an image-calculation processing period. Therefore, it is possible to swiftly and accurately detect that the data line signal from the imaging element is in the fixed state and a state is obtained in which the solid object recognition is not normally executed, without being affected by the environment such as contrast, and to provide a driving support system having higher reliability.

Figure 5:
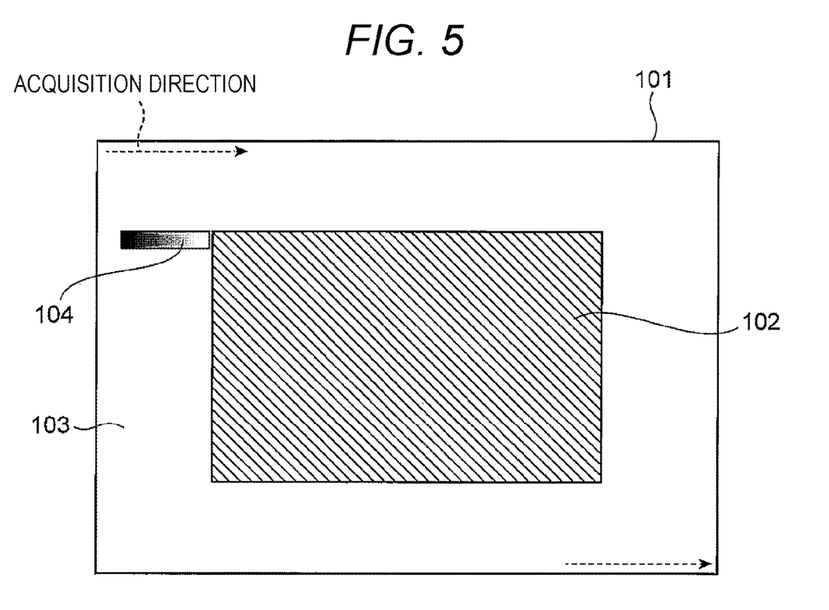
FIG. 5 is a diagram illustrating an example of a storage destination of a data line fixation diagnosis data region.

A data line fixation diagnosis data region of the present invention also includes an aspect in which storage is performed in a region illustrated in FIG. 5 as an example. FIG. 5 is a diagram illustrating an example of a storage destination of the data line fixation diagnosis data region.

The characteristic of this example is that the diagnosis data region 104 is provided in a position immediately before the image data of the effective image region 102 is acquired.

The diagnosis data region 104 is continuously provided on a front side of a starting point at which the acquisition of the image data of the effective image region 102 starts, in the data acquisition direction. In this example, the image data is acquired from the left edge of the entire imaging region 101 towards the right edge, and all of the image data items of the entire imaging region 101 are acquired by sequentially proceeding to the lower side, and thus, the diagnosis data region 104 is continuously provided in a position on a left side of the starting point which is an upper left edge of the effective image region 102 in the drawing. By providing the diagnosis data region 104 in such a position, it is possible to diagnose the fixed state of the data line signal immediately before the image data of the effective image region 102 is acquired from the imaging element. Therefore, for example, even in a case where the data line signal is in the fixed state from the start of the acquisition of the image data of the entire imaging region 101 from the upper left edge to the acquisition of the fixation diagnosis data of the fixation diagnosis data region 104, it is possible to detect such a fixed state.

Figure 6:
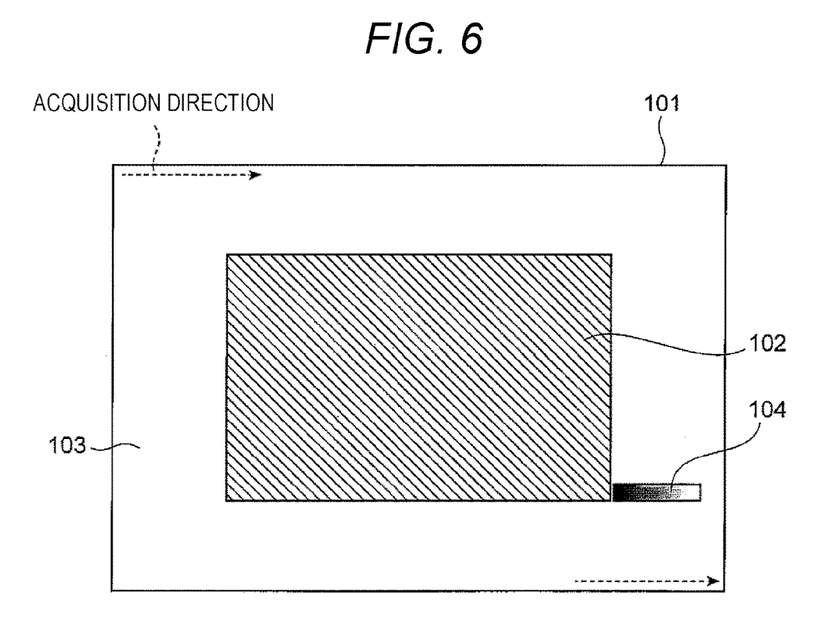
FIG. 6 is a diagram illustrating an example of the storage destination of the data line fixation diagnosis data region.

The data line fixation diagnosis data region of the present invention also includes an aspect in which storage is performed in a region illustrated in FIG. 6 as an example. FIG. 6 is a diagram illustrating an example of the storage destination of the data line fixation diagnosis data region.

The characteristic of this example is that the diagnosis data region 104 is provided on a rear side of the effective image region 102 in the data acquisition direction, in particular, is provided in a position immediately after all of the image data items of the effective image region 102 are acquired.

The diagnosis data region 104 is continuously provided on a rear side of an ending point at which the acquisition of the image data of the effective image region 102 ends, in the data acquisition direction. In this example, the image data is acquired from the left edge of the entire imaging region 101 towards the right edge, and all of the image data items of the entire imaging region 101 are acquired by sequentially proceeding to the lower side, and thus, the diagnosis data region 104 is continuously provided in a position on a right side of the ending point which is a lower right edge of the effective image region 102 in the drawing. By providing the diagnosis data region 104 in such a position, it is possible to acquire the fixation diagnosis data from the diagnosis data region 104 immediately after all of the image data items of the effective image region 102 are acquired. Therefore, it is possible to confirm the reliability of the image data of the corresponding frame.

Figure 7:
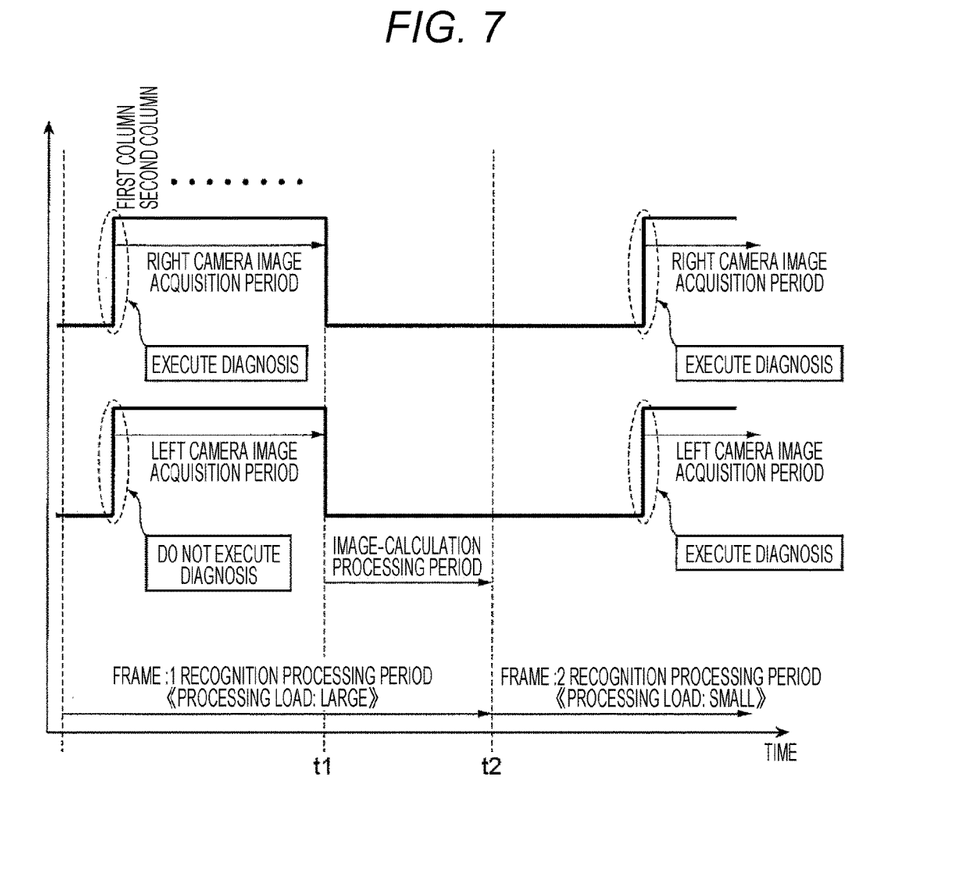
FIG. 7 is a diagram illustrating an example of a timing of executing diagnosis processing with respect to the right and left imaging element units.

FIG. 7 is a diagram illustrating an example of a timing at which the diagnosis processing is executed with respect to the right and left imaging element units.

It is considered that a calculation processing load of the image recognition processing unit 207 varies according to the image data output from the imaging element. For example, in a case of acquiring image data in which there are a plurality of targets of the solid object such as a preceding vehicle or a pedestrian while the vehicle travels, a plurality of solid object sensing processing are operated, and thus, the processing load increases. In contrast, in a case of acquiring image data in which there is no solid object and no target to be recognized while the vehicle stops, the processing load of the image recognition processing unit 207 decreases.

A case occurs in which the image recognition processing is not completed within a predetermined period of time due to the influence of the processing load generated in the execution of the failure-diagnosis, according to the hardware constraint condition of the stereo camera 201. In order to solve the problem described above, in a case of acquiring image data in which the processing load of the image recognition processing increases, the number of imaging element units executing the fixation diagnosis of the data line signal is limited, and thus, the influence on the execution of the recognition processing can be minimally suppressed.

Here, when the image recognition processing is executed, in a case where a degree of priority of any one of the respective image data items output from the right and left imaging element units 202 and 203 is high, it is preferable that the fixation diagnosis of the data line signal with respect to the imaging element unit outputting the image data of which the degree of priority is high is preferentially executed. For example, in a case where exposure control is executed by using only an image obtained by one imaging element unit or specific recognition processing is executed, the fixation diagnosis of the data line signal of the same imaging element unit is planned to be preferentially executed.

Figure 8:
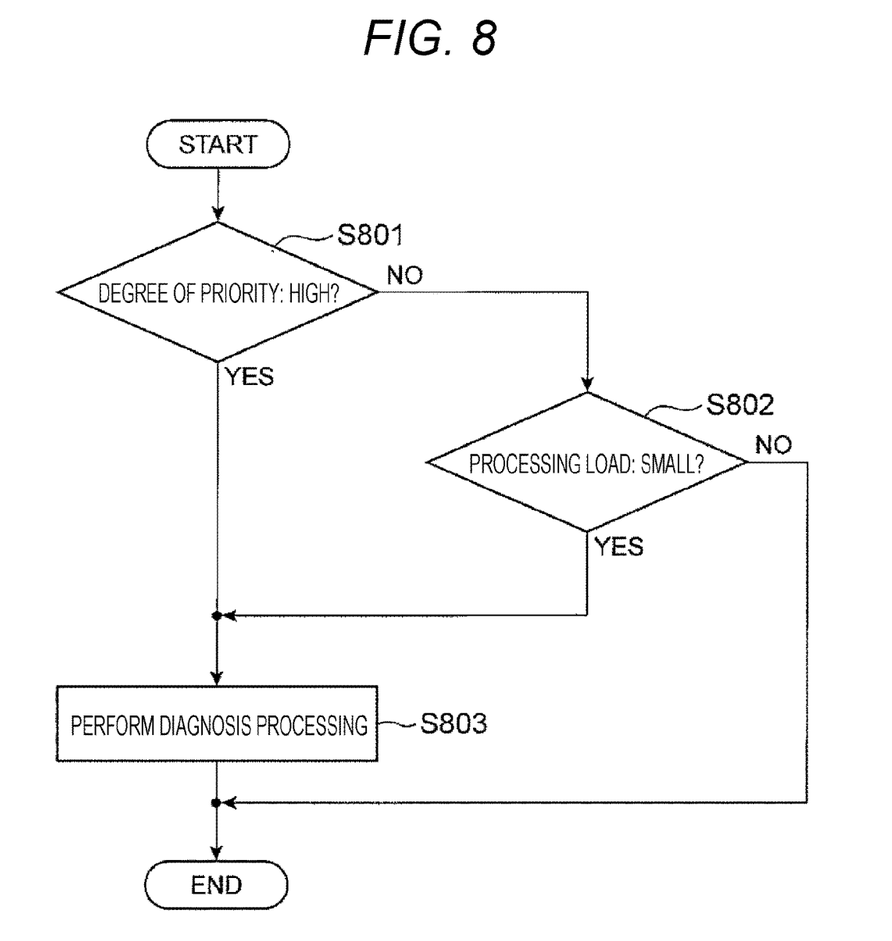
FIG. 8 is a flowchart illustrating switching of processing details according to a degree of priority and a processing load.

FIG. 8 is a flowchart illustrating switching of processing details according to a degree of priority and a processing load.

First, the confirmation of a degree of priority of the imaging element unit is executed (S801). In a pair of right and left imaging element units, degrees of priority are set with respect to each other. In a case of the imaging element unit, which is a diagnosis target, on a side where the degree of priority is high (YES in S801), among the pair of imaging element units, the diagnosis processing of the imaging element unit on a side where the degree of priority is high is executed regardless of the magnitude of the processing load. Then, in a case of the imaging element unit on a side where the degree of priority is low, the confirmation of the processing load status of the corresponding frame is executed (S802), and it is determined whether the diagnosis processing is executed.

In the confirmation of the processing load status (S802), in a case where it is determined that the processing load of the corresponding frame is less than a standard value set in advance (YES in S802), the diagnosis processing of the imaging element unit on a side where the degree of priority is low is also executed. In contrast, in a case where it is determined that the processing load of the corresponding frame increases (is greater than or equal to the standard value) (NO in S802), the diagnosis processing of the imaging element unit on a side where the degree of priority is low is not executed. Accordingly, the influence on the execution of the recognition processing can be minimally suppressed.

For example, in the example illustrated in FIG. 7, only the diagnosis processing of the right imaging element unit 202 on a side where the degree of priority is high is executed, and the diagnosis processing of the left imaging element unit 203 on a side where the degree of priority is low is not executed, on the basis of the determination that the processing load during a recognition processing period of a frame 1 is greater than or equal to the standard value (Processing Load: Large). Then, both of the diagnosis processing of the right imaging element unit 202 on a side where the degree of priority is high and the diagnosis processing of the left imaging element unit 203 on a side where the degree of priority is low are executed, on the basis of the determination that the processing load during a recognition processing period of a frame 2 is less than the standard value (Processing Load: Small).

In the above description, various embodiments and modifications have been described, but the present invention is not limited to the contents thereof. The other aspects considered within the range of the technical ideas of the present invention are also included in the scope of the present invention.

REFERENCE SIGNS LIST

101 entire imaging region
102 effective image region
103 ineffective image region
104 diagnosis data region
201 stereo camera (on-vehicle camera device)
202 right imaging element unit
203 left imaging element unit
204 image data acquisition unit
205 image-calculation processing unit
206 image data transmission unit
207 image recognition processing unit
208 failure-diagnosis processing unit
209 vehicle control processing unit
210 notification processing unit
211 on-vehicle communication bus
301 LO level fixation diagnosis data
302 HI level fixation diagnosis data
401 vertical synchronization signal

The invention claimed is:

1. An on-vehicle camera system that decreases an amount of time required to detect an error in stereoscopic imaging, the system comprising:
   a left camera having a first priority;
   a right camera having a second priority;
   a first processor that performs diagnosis processing; and
   a second processor communicatively coupled to the left camera, the right camera and the first processor, wherein the second processor:
      receives a left image from the left camera,
      receives a right image from the right camera, wherein the left image and the right image each include an effective image region, an ineffective image region, and a diagnostic data region,
      determines a processing load of the second processor,
      on a condition that the processing load of the second processor exceeds a threshold, causes the first processor to perform the diagnosis processing on either the left image or the right image based on the first priority and the second priority,
      on a condition that the processing load of the second processor does not exceed the threshold, causes the first processor to perform the diagnosis processing on both the left image and the right image, and
      performs image recognition processing based on the effective image region of the left image and the right image;
   wherein the diagnosis processing is performed during an image acquisition period and detecting the error in the stereoscopic imaging by using the diagnosis data region that includes fixation diagnosis data that indicates whether a data line signal of a respective left or right camera is in a fixed state in the ineffective image region, wherein the image acquisition period is a period in which image data of an entire imaging region of a respective left image or right image is acquired.

2. The on-vehicle camera system according to claim 1, wherein the diagnosis data region is provided on a front side of the effective image region in a data acquisition direction.

3. The on-vehicle camera system according to claim 2, wherein the diagnosis data region is continuously provided on a front side of a starting point at which the acquisition of the image data of the effective image region starts, in the data acquisition direction.

4. The on-vehicle camera system according to claim 1, wherein the diagnosis data region is provided on a rear side of the effective image region in a data acquisition direction.

5. The on-vehicle camera system according to claim 4, wherein the diagnosis data region is continuously provided on a rear side of an ending point at which the acquisition of the image data of the effective image region ends, in the data acquisition direction.

6. The on-vehicle camera system according to claim 1, further comprising:
   a third processor that performs calculations to identify solid object from the right image and left image data items during an image calculation processing period;
   wherein the diagnosis processing is performed during the image calculation period.

* * * * *